Patented June 17, 1947

2,422,429

UNITED STATES PATENT OFFICE 2,422,429

MATT BLACK PAINT COMPOSITION

John David Main-Smith and Edwin Charles Jones, Farnborough, England

No Drawing. Application August 9, 1945, Serial No. 609,926. In Great Britain April 25, 1945

6 Claims. (Cl. 106—193)

The invention relates to paint compositions giving a matt black surface finish to articles to which they are applied.

The invention is based on the discovery that a pigment powder comprising aniline black distributed through and over the surfaces of granules of an oxidic compound of trivalent chromium, i. e. chromic oxide or hydroxide, can be utilised to prepare paint compositions yielding a matt black finish having an exceptionally low light reflectivity. A pigment of this character is commercially available under the name Monolite Black B. S. powder or the alternative name Monolite Fast Black B. S.

In accordance with the invention a valuable paint composition yielding a matt black film comprises a solution of a cellulose ether admixed with a pigment as hereinbefore specified in such amounts that the weight ratio of the pigment to other constituents of the finished film obtainable from the composition is not less than 1.75 to 1, and preferably is not less than about 1.9 to 1.

The weight ratio of the pigment to other constituents of a finished film obtained from the composition is advantageously about 2 to 1. The content of pigment can be decreased to about 1.9 to 1 without marked increase of the low light reflecting capacity of the resulting finished films. If the ratio is still further decreased however the resulting black films show an appreciably higher light reflecting capacity and paints giving exceptionally black films are not obtainable when the ratio is less than 1.75 to 1. The pigment may be present in such amouits that the foregoing weight ratio substantially exceeds 2 to 1, without, however, any detectable improvement in the blackness of the finished film. Indeed beyond a certain weight ratio, which is dependent upon the nature and amounts of the other constituents of the composition, further addition of the pigment adversely affects the adhesive properties of the composition and is thus undesirable.

The particle size of the pigment is not without effect in determining the blackness of the finished film. Advantageously particles of the order of one thousandths of an inch are used. The pigment powder as sold commercially is generally well suited for admixture after breaking down any large aggregates of particles, and should not be subjected to grinding either before or in course of incorporation in the paint composition.

Among the cellulose ethers, the lower alkyl and the aralkyl ethers are preferably employed either singly or in combination, and in particular ethyl cellulose has been found a most satisfactory ether for the purposes of this invention. Benzyl cellulose can also be mentioned as giving good results. A considerable range of solvents for cellulose ethers are available and in general any solvent or mixture of solvents are suitable which yield a clear finished film of the ether.

Other ingredients may be present in relatively small quantities in the composition as, for example a plasticiser which may be useful in eliminating a tendency to blushing.

The pigment needs to be thoroughly mixed with the cellulose ether solution and this mixing can be very quickly effected in a ball mill or cone mill which means, however, should not be employed in such manner as to cause appreciable reduction of size of pigment particles. Thinners may be added as desired in order to secure a composition suitable for application by the particular method contemplated in each case, whether by brushing or by spraying.

The following example is given by way of illustration of the invention, the parts being by weight:

An ethyl cellulose solution is prepared from

| | Parts |
|---|---|
| Xylene | 30 |
| Toluene | 30 |
| Butyl alcohol | 10 |
| Butyl acetate | 10 |
| Aviation petrol (unleaded) | 108 |
| Ethyl cellulose | 12 |

24 parts of Monolite Black B. S. powder as sold commercially are incorporated in this solution and intimate admixture is secured by running for a few minutes in a cone mill having widely set cones.

0.3 parts of dibutyl phthalate may also be added if desired to improve the flexibility and other properties of the finished film resulting from the application of the paint composition to a surface.

The paint compositions according to the invention may be applied by any known method, e. g. brushing or spraying and allowing the surface to dry.

The finished film obtained from this composition is intensely matt black in appearance and has a lower light reflecting capacity than any other commercial paint composition hitherto made available.

Larger quantities of pigment may be incorporated in the solution but it has been found that on adding as much as 30 parts of pigment the resulting composition has less satisfactory adhesive film forming properties when coated on a surface.

The intense blackness of the films produced from these compositions and their remarkably low light reflecting capacity make these compositions of value for coating optical and photographic materials and appliances and for any other purposes where absence of light reflecting capacity from surfaces is required, as for example in producing special artistic effects or in camouflage treatment.

We claim:

1. A matt black coating composition comprising a solution of a cellulose ether and a pigment powder comprising aniline black distributed through and over the surfaces of granules of an oxidic compound of trivalent chromium, wherein the weight ratio of the pigment to other constituents of the finished coating obtainable from the composition is approximately 2 to 1.

2. A matt black coating composition comprising a solution of ethyl cellulose and a pigment powder comprising aniline black distributed through and over the surfaces of granules of an oxidic compound of trivalent chromium, wherein the weight ratio of the pigment to other constituents of the finished coating obtainable from the composition is between 1.9 to 1 and 2.5 to 1.

3. A matt black coating composition comprising a solution of a cellulose ether in a solvent volatile at normal atmospheric temperature and a pigment powder comprising aniline black distributed through and over the surfaces of granules of an oxidic compound of trivalent chromium, wherein the weight ratio of the pigment to the other non-volatile components is between 1.75 to 1 and 2.5 to 1.

4. A matt black coating composition as claimed in claim 3, and having pigment particles of a size of the order of 0.001 in.

5. A matt black coating composition comprising a solution of a cellulose ether and a pigment powder comprising aniline black distributed through and over the surfaces of granules of an oxidic compound of trivalent chromium, wherein the weight ratio of the pigment to other constituents of the finished coating obtainable from the composition is between 1.75 to 1 and 2.5 to 1.

6. A matt black coating composition comprising a solution of a cellulose ether and a pigment powder comprising aniline black distributed through and over the surfaces of granules of an oxidic compound of trivalent chromium, wherein the weight ratio of the pigment to other constituents of the finished coating obtainable from the composition is between 1.9 to 1 and 2.5 to 1.

JOHN DAVID MAIN-SMITH.
EDWIN CHARLES JONES.

REFERENCES CITED

The following references are of record in the file of this patent:

UNITED STATES PATENTS

| Number | Name | Date |
| --- | --- | --- |
| 1,896,040 | Ruben | Jan. 31, 1933 |
| 1,931,485 | Caprio | Oct. 24, 1933 |
| 2,118,512 | Hucks | May 24, 1938 |
| 2,085,512 | Schneider | June 29, 1937 |
| 2,173,445 | Zapp | Sept. 19, 1939 |
| 1,942,491 | Randolp | Jan. 9, 1934 |

FOREIGN PATENTS

| Number | Country | Date |
| --- | --- | --- |
| 27,177 | Australia | June 11, 1930 |

OTHER REFERENCES

"Printing Inks," Ellis, (1940), page 177.